July 13, 1948.   S. TANDIORIO   2,445,284
FLESHING MACHINE
Filed Jan. 3, 1947

INVENTOR.
Sam Tandiorio
BY
Darby + Darby
ATTORNEYS

Patented July 13, 1948

2,445,284

UNITED STATES PATENT OFFICE 2,445,284

FLESHING MACHINE

Sam Tandiorio, Forest Hills, N. Y., assignor to Alaska Chemical Corporation, Paterson, N. J., a corporation of New Jersey Application January 3, 1947, Serial No. 719,988

2 Claims. (Cl. 69—41)

The present invention relates to a machine for removing the flesh from animal pelts and particularly for removing flesh from pelts of fur bearing animals in the preparation of those pelts for use in the manufacture of fur coats and the like.

Such machines have been utilized in the past both in this art and in the preparation of hides in the leather industry. Such machines were, however, not completely satisfactory since it was necessary, in order to completely remove the flesh, to have the adjustment of the machine such that the cutting blades which removed the flesh frequently also cut into the pelt.

My present invention overcomes this disadvantageous feature of the earlier machines in a very simple manner and in addition to overcoming this disadvantage causes a breakdown of the fibers of the leather or hide and a stretching of the pelt which is retained through later processing. In some instances this stretching renders the finally completed and dressed skin twenty per cent larger than it was originally.

It is an object of this invention to provide a fleshing machine in which the flesh may be substantially entirely removed from the pelts without danger of cutting into the leather or skin proper.

It is another object of the invention to provide such a machine which, during the fleshing operation, breaks down the fibers of the leather and appreciably and permanently stretches the skin.

It is a still further object of the invention to devise a fleshing machine so organized that the feed roller thereof need not be replaced and thus reduce materially the cost of operating the machine.

Other objects and features of the invention will be apparent when the following description is considered in connection with the attached drawing in which—

Figure 1:
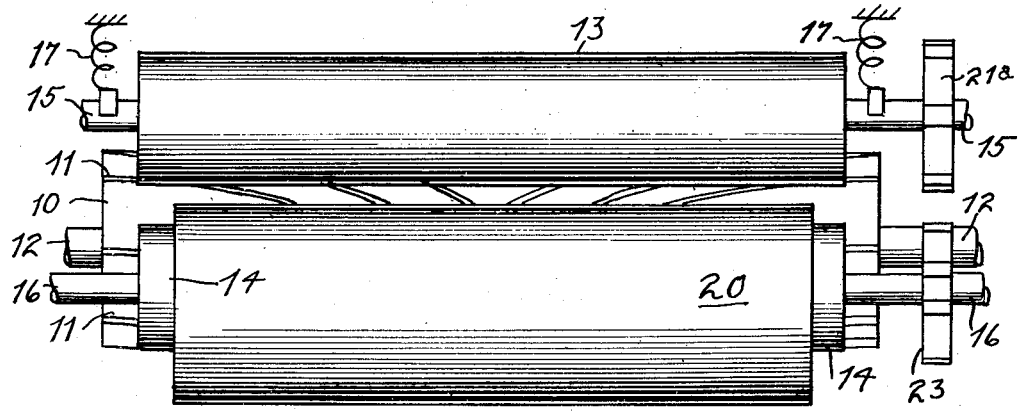
Figure 1 is a front elevation of the feed rollers and knife of a fleshing machine showing my improvement thereto in place thereon.
Figure 2:
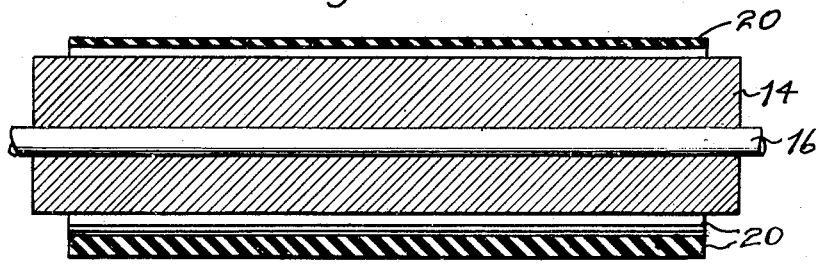
Figure 2 is a cross sectional view of the lower feed roller of the machine of Figure 1 showing the flexible rubber sleeve of my invention in position.

My improvement is shown in connection with a well known form of fleshing machine which comprises a drum 10 having spirally arranged knives 11 thereon, this drum being rotated at a speed of approximately 1500 revolutions per minute by means of a suitable drive applied to the shaft 12 on which the drum 10 is mounted.

The machine mentioned is also provided with a pair of feed rollers 13 and 14 mounted on the respective shafts 15 and 16, the shaft 15 being driven at all times by means of gearing, not shown, connecting it to the shaft 12. The gear arrangement is such that the feed rollers operate at a speed in the neighborhood of 150 revolutions per minute. The shaft 15 of roller 13 is spring pressed downwardly by means of the springs indicated at 17 and suitable means, not shown, are provided to limit this downward movement.

Figures 3, 4:
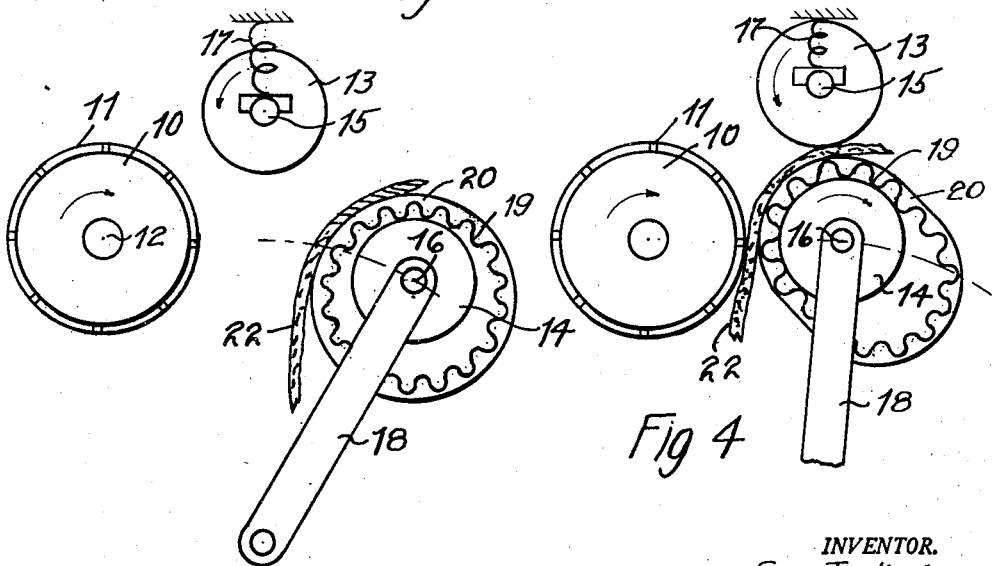
Figure 3 is a side elevation of the mechanism shown in Figure 1, the parts being in their non-operating position.
Figure 4 is a view similar to Figure 3 but showing the position the parts assume when the machine is operated and the flesh is being removed from a pelt.

The shaft 16 is carried in bearings in a pair of pivoted arms 18, see Figure 3, and may be moved into position in which the roller 14 is in contact with the roller 13 at which time the rapidly revolving knives 11 serve to remove the flesh from a pelt which is laid on the rollers and fed between these rollers in the direction indicated by the arrows. Adjustable stops are provided to limit the movement of arms 18 and thus adjust the machine for pelts of different types and thickness.

Both in the old machines and in my present machine, gears 21a and 23 are provided respectively on shafts 15 and 16, see Figure 1, these gears going into mesh as the rollers move into the position indicated in Figure 4 and thus serving to drive the lower feed roller 14 positively. As has been stated, the machine thus far described is in common use and has numerous disadvantages which have been enumerated above.

I have discovered that by placing a sleeve 20 of rubber having a corrugated inner surface over the roller 14 the pelt may be caused to approach the knives much more closely without danger of damaging the leather or of loosening the fur from the leather. Preferably, the ribs or corrugations 19 on the inner surface of the sleeve 20 extend longitudinally. However, spiral ribs may be utilized. Furthermore, the sleeve 20 stretches longitudinally of the shaft and apparently causes the pelt to stretch with it. This, combined with the very close adjustment which can be made, serves to not only remove the flesh from the pelt but also serves to breakdown the fibers of the leather and permanently stretch the leather. Additionally, the breakdown of the fibers makes the pelt more receptive to the further processes of tanning and dying and thus improves the quality of the ultimate product.

As is seen in Figure 3, the rubber sleeve 20 of my invention is considerably larger than is the roller on which it is mounted. In a particular instance the sleeve 20 was made of pure para rubber and had an internal diameter of five inches. The sleeve had an exterior diameter of five and one-half inches and was provided with corrugations of circular contour and of one-quarter inch radius and this sleeve was mounted upon a feed roller 14 which had a diameter of four inches.

When the arms 18 are in the position shown in Figure 3 the sleeve 20 assumes the position shown in Figure 3 and makes contact with the roller 14, only along the top of the roller. However, when the arm 18 is moved to its operated position either under manual urge or by means of eccentrics or the like embodied in the machine, the sleeve 20 takes a position such as that shown in Figure 4 and the ridges 19 of the corrugations are in contact with the roller 14 over a considerable portion of the roller's periphery, the sleeve then taking the shape indicated in Figure 4 and apparently serving to hold the pelt 22 in contact with the knives over a longer period of time than was formerly the case.

In any event whether this be the explanation or not, it is true that by the use of the corrugated rubber sleeve of my invention the flesh is removed from the skin without any appreciable residue and the skins are permanently stretched and rendered more receptive to the following processes in the dressing thereof.

The sleeve of my invention should be relatively flexible and as has been indicated is preferably made of pure para rubber. The sleeve must have an internal diameter larger than the external diameter of the roller although there is apparently no upper limit to the internal diameter of the sleeve with respect to its cooperating roller other than that dictated by convenience.

As has been stated, the use of the sleeve of my invention substantially entirely eliminates cutting of the skins and furthermore produces this result even when the skins are carelessly placed in position on the machine and additionally, it eliminates the damaging of skins when the machine is first set up for a particular run of skins.

The mode of operating the machine with the sleeve of my invention applied thereto is identical with that formerly used. A pelt is placed on the sleeve in such a position that the knives 11 will come into contact with the pelt above the longitudinal center thereof as seen in Figure 4, the pelt being then fed out by the action of the rollers 13 and 14 and sleeve 20 and the flesh being removed from somewhat more than half the pelt. The pelt is then reversed end for end, placed in the machine and the flesh removed from the other half thereof.

Normally, the machine must be adjusted at the start to limit the movement of the arms 18 in order that the penetration of the knives will be through the flesh but not into the skin. With the old machines these starting adjustments invariably damaged and destroyed a number of skins. With my machine the adjustment can be made without any damage whatsoever and thus many skins are saved which in the past were wasted.

While I have described a preferred embodiment of my invention, it will be apparent that other forms may be devised without departing from the spirit of the invention. Consequently, I wish to be limited not by the foregoing description, which was given solely for the purpose of illustration, but only by the appended claims.

What is claimed is:

1. In a fleshing machine having a revolving cutter and a pair of feed rollers adapted to hold a pelt against the cutter, in combination, a sleeve of flexible rubber, said sleeve having corrugations on its inner surface and having a larger internal diameter than the external diameter of the lower feed roller, said sleeve being mounted on the lower feed roller loosely and serving as a surface with which the upper feed roller cooperates and on which the pelt is placed during the fleshing operation.

2. In a fleshing machine having a revolving cutter and a pair of feed rollers adapted to hold a pelt against the cutter, in combination, a sleeve of flexible rubber, said sleeve having longitudinally-extending corrugations on its inner surface and having a larger internal diameter than the external diameter of the lower feed roller, said sleeve being mounted on the lower feed roller loosely and serving as a surface with which the upper feed roller cooperates and on which the pelt is placed during the fleshing operation.

SAM TANDIORIO.

REFERENCES CITED

The following references are of record in the file of this patent:

UNITED STATES PATENTS

| Number | Name | Date |
| --- | --- | --- |
| 2,038,621 | Whitney | Apr. 28, 1936 |
| 2,220,721 | Johnson | Nov. 5, 1940 |